United States Patent
Scouller et al.

(10) Patent No.: US 8,438,327 B2
(45) Date of Patent: *May 7, 2013

(54) RECOVERY SCHEME FOR AN EMULATED MEMORY SYSTEM

(75) Inventors: Ross S. Scouller, Austin, TX (US); Daniel L. Andre, Austin, TX (US); Frank K. Baker, Jr., Austin, TX (US); Stephen F. McGinty, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 295 days.

This patent is subject to a terminal disclaimer.

(21) Appl. No.: 12/826,814

(22) Filed: Jun. 30, 2010

(65) Prior Publication Data

US 2012/0005403 A1 Jan. 5, 2012

(51) Int. Cl.
*G06F 13/00* (2006.01)
(52) U.S. Cl.
USPC .................... 711/103; 711/154; 711/156
(58) Field of Classification Search .................. 711/103, 711/154, 156
See application file for complete search history.

(56) References Cited

U.S. PATENT DOCUMENTS

| 7,274,999 B1 | 9/2007 | Saether |
| 7,512,751 B2* | 3/2009 | Ellis et al. ................ 711/154 |
| 7,693,669 B2 | 4/2010 | Saether |

* cited by examiner

*Primary Examiner* — Reba I Elmore
(74) *Attorney, Agent, or Firm* — Joanna G. Chiu; James L. Clingan, Jr.

(57) ABSTRACT

A system includes an emulation memory having a first sector of non-volatile memory for storing information, in which the non-volatile memory includes a plurality of records. It is determined if a last record written of the plurality of records is a compromised record, if the last record written is not a compromised record, a next write is performed to a record of the plurality of records that is next to the last record written. If the last record written is a comprised record, an address of the compromised record is determined, valid data for the address of the compromised record is written into the record of the plurality of records that is next to the compromised record, and data is written into a record that is next to the record of the plurality of records that is next to the compromised record.

20 Claims, 4 Drawing Sheets

RECOVERY SCHEME FOR AN EMULATED MEMORY SYSTEM

BACKGROUND

1. Field

This disclosure relates generally to emulated memory systems, and more specifically, to a recovery scheme for an emulated non-volatile memory system.

2. Related Art

Non-volatile memory systems typically require, during update cycles, a minimum supply voltage level for proper operation. During brownouts, the supply voltage of a non-volatile memory system drops below its minimum supply voltage level, which can result in data errors either at the point of recovery or later in the future, or may even result in a fatal error of the memory system. Brownouts are typically unexpected losses of power during operation. Furthermore, as the end of life for a non-volatile memory system approaches, the inability to program a bit or erase a bit may also result in similar error issues as a brownout. Therefore, a recovery scheme is needed in order to maintain reliability and integrity of a non-volatile memory systems when errors occur.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
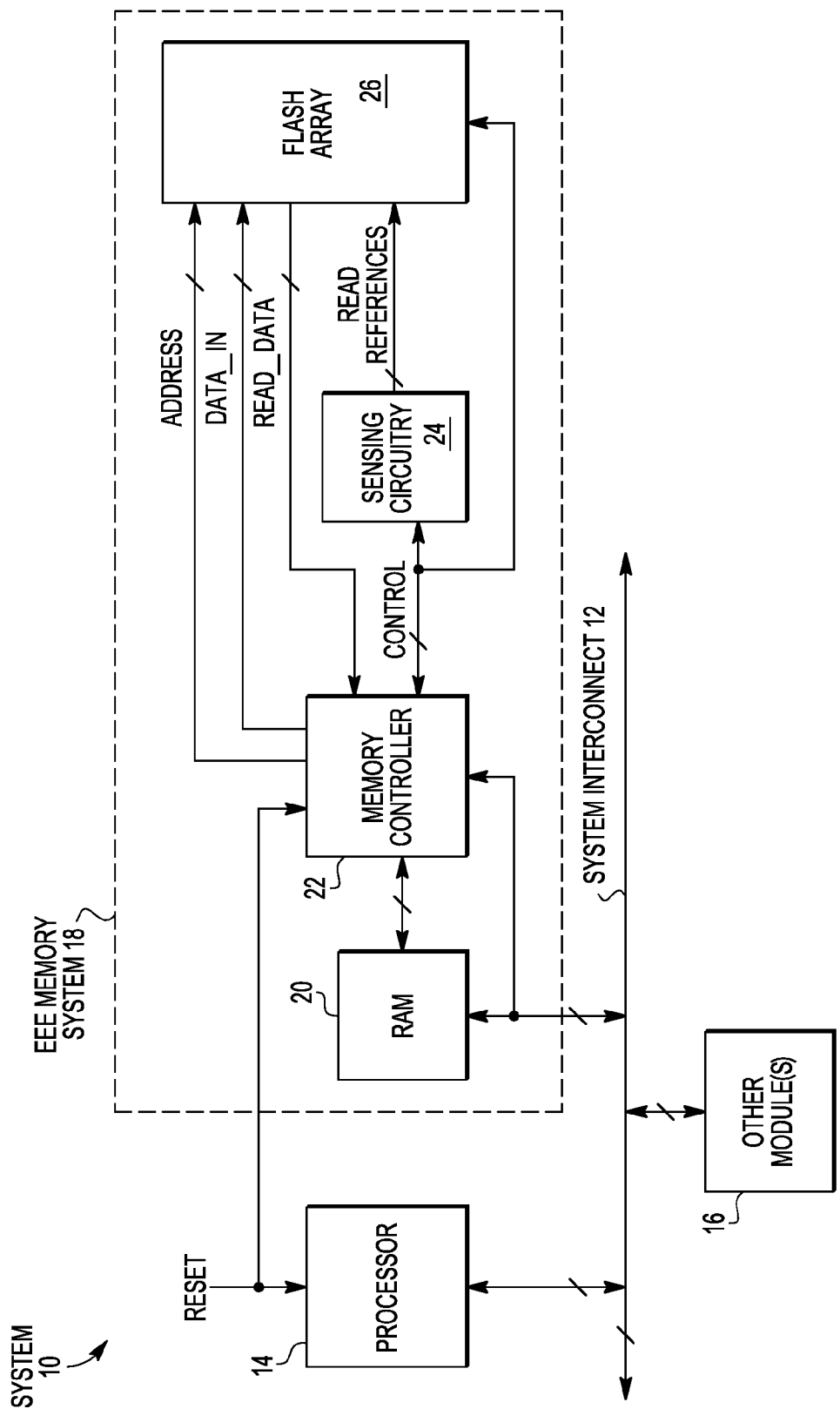
FIG. 1 illustrates in block diagram form a system, including a non-volatile memory system, in accordance with an embodiment of the present invention.

One type of emulated non-volatile memory system for which recovery is useful is an emulated electrically erasable programmable read only memory (EEPROM) system (EEE systems). In one example of an EEE system, a processor or other master device communicates directly to a random access memory (RAM). A memory controller of the EEE system monitors updates to the RAM and stores updated address/data pairs (corresponding to the address of the updated location in the RAM and the data corresponding to that address) in a non-volatile memory (NVM), such as, for example, a flash memory. These address/data pairs (where each pair may be referred to as a record) are sequentially stored in the order in which they are updated by the processor or master device to consecutive locations in the NVM. Each record may also include one or more status bits. For example, the records described herein for storage in the NVM each include two status bits which indicate whether the corresponding record is a valid record, an erased record, in the process of being erased, or an invalid record. When updating a record in the NVM, such as in response to an update request received from the processor or other master device or in response to a compression routine within the NVM, an error may occur. For example, a brownout or a failure to program may occur during the storing of a new record into an NVM location. Also, a failure to erase may occur during a block erase of an NVM sector which may also result in an error.

In one embodiment, a flash memory is used as the NVM. In one example, and as used herein, programming refers to storing a logic level zero to a bitcell and erasing refers to storing a logic level one to a bitcell. However, in alternate embodiments, programming may refer to storing a logic level one to a bitcell and erasing may refer to storing a logic level zero to a bitcell. A logic level zero may also be referred to as a logic low and a logic level one may also be referred to as a logic high. Also, the embodiments of FIGS. 1-4 herein will be described in reference to an EEE memory system; however, the discussions herein can apply to any non-volatile memory system which implements a sequential record system. Furthermore, as used herein a valid record refers to a record which has valid data corresponding to a valid address within the RAM, and an erased record refers to a record that is obsolete in that the address indicated in the erased record no longer stores the data value in the erased record. Therefore, an erased record may also be referred to as an obsolete record. Note that an erased record is a record that was previously used but whose current stored values are no longer reliable or correct.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

The symbol "$" or "0x" preceding a number indicates that the number is represented in its hexadecimal or base sixteen form. The symbol "%" or "0b" preceding a number indicates that the number is represented in its binary or base two form. Note that in FIG. 2, the value of "FFFF" is in hexadecimal form and corresponds to "1111111111111111" in binary form FIG. 1 illustrates, in block diagram form, a system 10 which includes a processor 14, other module(s) 16 (if any), a system interconnect 12, and an EEE memory system 18 (which may also be referred to as an emulated memory system or a non-volatile memory system). Each of processor 14, other module(s) 16, and EEE memory system 18 are bidirectionally coupled to system interconnect 12. EEE memory system 18 includes a RAM 20, a memory controller 22, sensing circuitry 24, and a flash array 26 (which may also be referred to as an NVM array, where any type of NVM may be used in place of the flash memory). RAM 20 is bidirectionally coupled to system interconnect 12 and to memory controller 22. Memory controller 22 is coupled to sensing circuitry 24 and flash array 26. Sensing circuitry 24 is coupled to flash array 26. Memory controller 22 communicates control signals with sensing circuitry 24. Memory controller 22 communicates control signals with flash array 26, provides an address and data_in to flash array 26 and receives read data from flash array 26. Sensing circuitry 24 is capable of providing appropriate read references (where the references may be in the form of reference voltages or reference currents). A reset signal is provided to processor 14 and memory controller 22. This reset signal may be, for example, a global reset signal for system 10.

Processor 14 can be any type of processor, such as a microprocessor, digital signal processor, etc., or may be any other type of interconnect master which can access EEE memory system 18. In one form, system interconnect 12 is a system bus. Other forms of interconnect may be used including, for example, crossbars, point-to-point connections, and optical and wireless transmission techniques. Other modules 16 may include any type of module, such as, for example, another memory, another processor, another interconnect master, a peripheral, an input/output (I/O) device, etc. Alternatively, no other modules may be present in system 10.

In operation, processor 14 can send access requests (read or write access requests) to memory system 18. The access requests from processor 14, which include an access address, and, in the case of a write access, associated write data, are provided to RAM 20. In the case of a read access, RAM 20 provides processor 14 the data stored at the received access address location. In the case of a write access, RAM 20 stores the received write data at the received access address location. In the case of a write access, memory controller 22 may detect an update of RAM 20 and selectively store the received access address and associated write data to flash array 26 in a logically sequential manner. For example, in the case of an update (a write) to RAM 20, the received access address and associated write data are used to form a record that is written to flash array 26 at the next available location. This next available location is logically sequential to a location that was loaded during an immediately preceding loading of flash array 26. (Note that, referring to FIG. 1, the received access address can be provided as address to flash array 26 and the associated write data as data_in to flash array 26.) In one example, the writing of the record corresponding to the RAM update is only performed if the value that is currently stored at the RAM location is different from the new write value associated with the write access request for that RAM location. In this manner, flash array 26 can store the values of RAM 20 which have been updated in a more permanent manner. That is, when RAM 20 loses power, its data is lost. Upon restoring power, the values of the RAM may be restored from flash array 26, which does not lose its data upon losing power. In one embodiment, flash array 26 has a greater storage capacity than RAM 20. For example, flash array 26 may have a capacity of at least four times greater than RAM 20.

Figure 2:
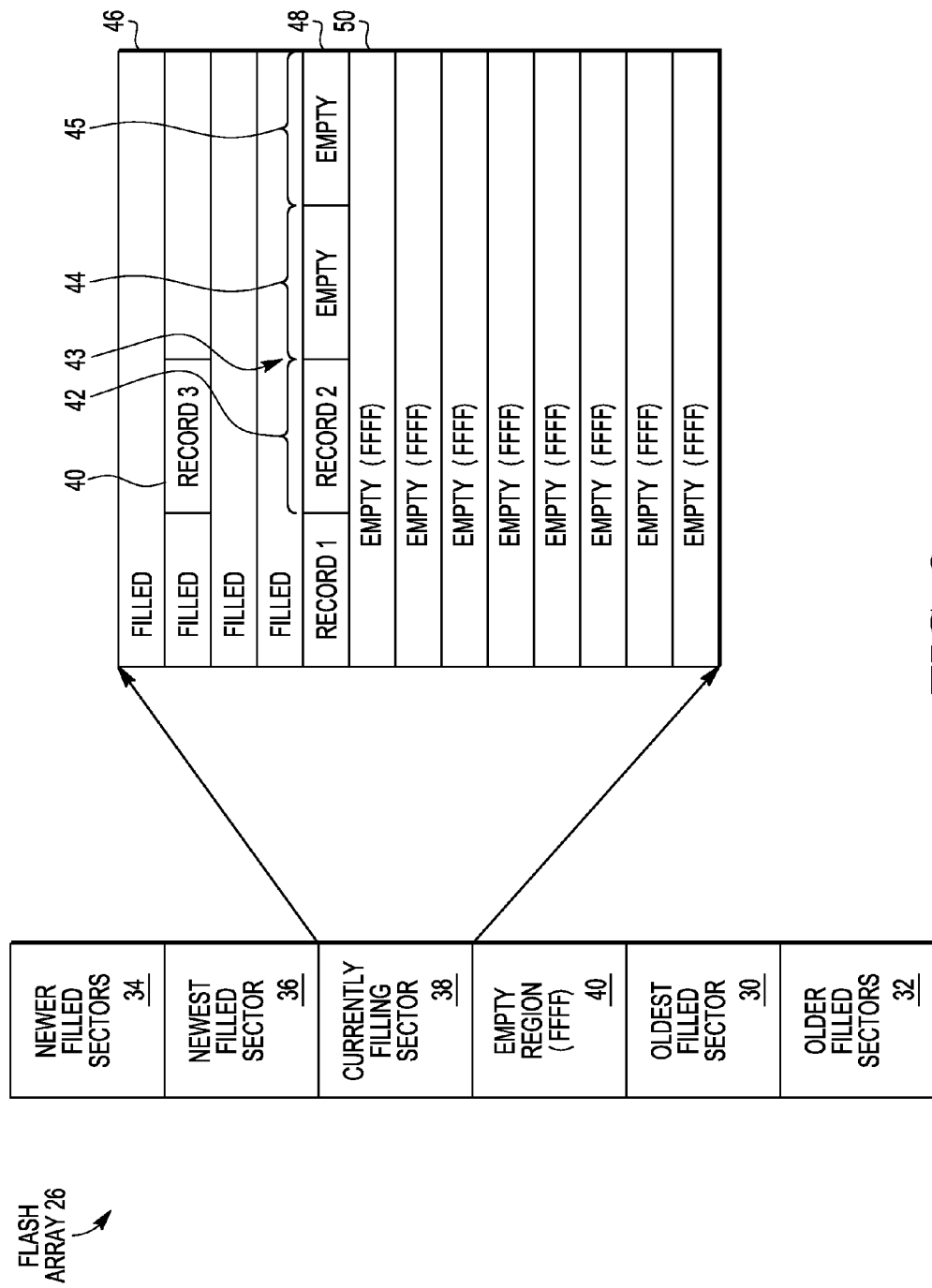
FIG. 2 illustrates, in block diagram form, a flash array of FIG. 1 in accordance with an embodiment of the present invention.

Operation of EEE memory system 18 will be described in further detail with respect to FIG. 2. FIG. 2 illustrates, in block diagram form, an embodiment of flash array 26 during operation of EEE memory system 18. Initially, all of flash array 26 is empty. In one embodiment, when a location of flash array 26 is empty, it has not yet been written with any value thus is in its erased state. In the embodiments described herein, the erased state corresponds to a logic level one; therefore, each empty or erased location of flash array 26 stores a logic level one. Flash array 26 includes N sectors. In one embodiment, data may be written to any location within these sectors; however, when an erase is desired, each sector can only be erased as a block (on a sector by sector basis, where an erase of a sector may simultaneously erase all the contents of that sector). Note that when, in FIG. 2, a particular sector, region, or line is referred to as empty, "FFFF" is provided in parenthesis which represents that the bits in that empty sector, region, or line are logic level ones.

As described above, each location of flash array 26 is updated in a sequential order, starting with a first location. Upon a next, immediately subsequent, update of RAM 20 (where the new write value is different from the value currently stored at the RAM location to be updated), a next location, adjacent and logically sequential to the first location, is written with a new record (and thus becomes the previous location for an immediately subsequent update). Therefore, upon an immediately subsequent update of RAM 20 (where the new write value is different from the value currently stored at the RAM location to be updated), a next location in flash array 26, adjacent and logically sequential to the previous location, is written with a new record. Thus, with each update of RAM 20 that is to be reflected in flash array 26, flash array 26 is loaded with a new record in a sequential manner. In the illustrated embodiment, flash array 26 includes an empty region 40 (which may include one or more empty sectors), an oldest filled sector 30, older filled sectors 32, newer filled sectors 34, a newest filled sector 36, and a currently filling sector 38. In the illustrated embodiment, the first location to have been written upon an update of RAM 20 is the first location within oldest filled sector 30. That is, filled sector 30 is filled with records (address/data pairs corresponding to data stored in RAM 20) and was the sector that was first filled. In one embodiment, a filled sector, such as filled sectors 30, 32, 34, and 36, includes no empty locations. The next sectors, in time, to have been filled after oldest filled sector 30 are older filled sectors 32. Each sector in older filled sectors 32 was filled in sequentially, where each location in each sector of older filled sectors 32 was filled in sequentially. The next sectors, in time, to have been filled after older filled sectors 32 are newer filled sectors 34. Again, each sector in newer filled sectors 34 was filled in sequentially, where each location in each sector of newer filled sectors 34 was filled in sequentially. Also, note that after the last filled sector of older filled sectors 32, the sequential filling wrapped around to the top of flash array 26 to the first sector of newer filled sectors 34. Therefore, note that two record locations in flash array 26 (i.e. a pair of NVM locations) may be considered adjacent (i.e. logically adjacent or logically sequential), even if the second of the two locations requires a wrap around either to the next line, next sector, or even the top of flash array 26. The next sector, in time, to have been filled after newer filled sectors 34 is newest filled sector 36. Again, each location in newest filled sector 36 was filled in sequentially. Therefore, newest filled sector 36 stores more recent data from RAM 20 than newer filled sectors 34 which store more recent data from RAM 20 than older filled sectors 32 which store more recent data from RAM 20 than oldest filled sector 30.

Still referring to FIG. 2, the next sector, in time, to be filled after newest filled sector 36 is currently filling sector 38. Therefore, FIG. 2 represents flash array 26 at a particular point in time during operation of memory system 18 during which sector 38 is currently being filled. FIG. 2 illustrates a blown up version of this sector to better understand how flash array 26 gets sequentially filled (i.e. written to or loaded). Note that currently filling sector 38 began filling at its first location after the last location of newest filled sector 36 was filled. Currently filling sector 38 is illustrated as having a plurality of lines, where each of the first four lines represents a filled line 46 (in which all locations within the line are filled and thus no locations within that line are empty). Location 40 represents a location within one of the filled lines which stores an address of RAM 20 and a corresponding data value that is stored a that address of RAM 20. Each of the last 8 lines of currently filling sector 38 represents an empty line 50 (in which all locations within the line are empty, being logic level ones, and thus no locations within the line are filled). Currently filling sector 38 is currently being filled at line 48, which includes both filled locations and empty locations, separated by a boundary 43. Note that location 42 represents the location storing the most recently written record, record2, where record2 stores an address which represents the address location in RAM 20 that was most recently updated with a new value and stores a data value which represents the updated value written to that address location in RAM 20. Location 44, which is adjacent location 42, represents the next available, sequentially addressable, location where the next update to RAM 20 would be recorded. Note that the location sequentially preceding location 42 stores record1 which stores the next most recently updated address location in RAM 20, updated prior to the address stored in record2, and stores the updated value that was written to the next most recently updated address in RAM 20.

Note that each sector of flash array 26 can have any number of lines, and the illustration of currently filling sector 38 simply provides one example of the sectors each including 13 lines. Therefore, it can be understood how the loading of flash array 26 is performed sequentially according to sequential addresses. Note that operation of memory controller 22 in filling flash array 26 in the sequential manner described above is known in the art.

In one embodiment, each record, in addition to an address and data pair, includes one or more status bits. In the embodiment described herein in reference to FIG. 3 below, it is assumed that each record includes two status bits. In one embodiment, a value of 0b11 for a record indicates that the record is a valid record. A valid record indicates that the data of the valid record is stored in RAM 20 at the address location of the valid record. A value of 0b00 indicates that the record is an erased record. An erased record is a record that has been previously used but is now obsolete. That is, the data of the erased record is no longer validly stored in RAM 20 at the address location of the erased record. A value of 0b01 indicates that recovery has started and thus the record is in the process of being erased. That is, it indicates that the record is in transition from a valid record to an erased record. The status bits of a valid record which is being erased may first be updated to 0b01 and then, in a subsequent step of the erase process, may be updated to 0b00. In one embodiment, this multiple step erase is done such that a brownout during an erase of a location may be detected.

When failures occur during the writing of a record, the resulting written record may not be correct, and thus considered a compromised (or erroneous) record. In one example, a record may be compromised due to a failure to program. For example, a failure to program may be likely to occur as the end of life for the technology is approached. In another example, a record may be compromised due to a failure to erase. For example, during the erase of a sector of flash array 26, one or more locations may fail to fully erase. In another example, a record may be compromised due to a brownout. For example, brownouts may occur during the writing of new values to flash array 26, which may result in erroneous data. The location most likely affected by a brownout is the location that was most recently written to within flash array 26. Due to the sequential nature of how flash array 26 is filled, it is known which location was most likely affected, if at all, by a brownout. For example, in one embodiment, a brownout may have occurred during the writing of location 42 in currently filling sector 38 where either the address or data portion of record2 in location 42 actually stores an incorrect value (and thus record2 in location 42 may be referred to as a compromised record). In another example, a brownout may have occurred during the writing of location 44. However, it may be that location 44 was not yet sufficiently programmed to its desired values, thus still being read as "FFFF" (i.e. as empty) even though it was already "touched", i.e. attempted to be written to, when the brownout occurred. Therefore, location 44 may be seemingly empty rather than truly empty and thus be considered a compromised record. In this case, one or more bits of location 44 may have been left in a marginally erased state which may cause future problems. For example, bits left in a marginally erased state may not maintain their desired states for a sufficient amount of time.

Note that any known method may be used to detect a compromised record, such as due to a failure to program, failure to erase, or a brownout. For example, in one embodiment of brownout detection, the last record location (e.g. location 42) and first erased record location (e.g. location 44) can be read at comparative margin levels to determine whether a possible brownout occurred during the writing of location 42 or an erase of location 44, and thus determine if location 42 or location 44 stores a compromised record. In one embodiment, an incomplete record (such as where an address exists but no data was yet stored for the address in the record, meaning the address is a non 0xFFFF value but the data is still a 0xFFFF value) may also be identified as a compromised record. In the case of a failure to program or a failure to erase, a record may be determined as compromised in response to the verification of the write operation. Once a record is determined to be compromised, it may be marked as such. For example, in one embodiment, a listing of compromised records may be maintained within EEE memory system 18 or elsewhere within system 10. In order to maintain the accuracy of EEE memory system 18, compromised records should be removed. That is, as will be described below, compromised records are erased (i.e. marked as obsolete) such that they cannot be transferred to RAM 20 upon a reset to initialize RAM 20. Also, by erasing the compromised records, they are not included during compression operations of flash array 26 in which space is generated in flash array 26 by copying valid records out of oldest filled sector 30 such that the flash sector may be erased (such as by setting all bit values to a logic level 1). In this manner, EEE memory system 18 may recover from a brownout or failure to program or erase.

Figure 3:
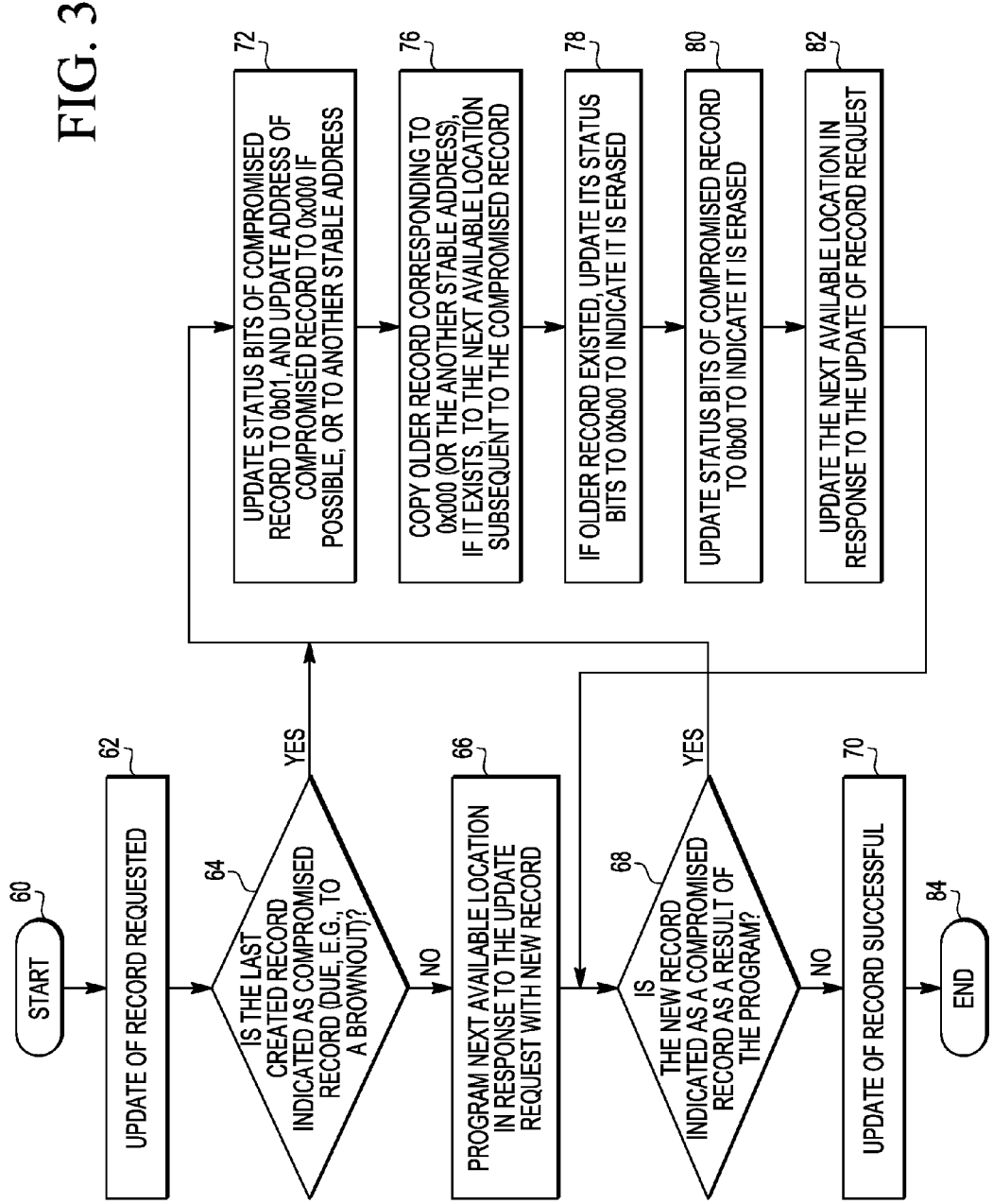
FIG. 3 illustrates, in flow diagram form, a method for recovering from a brownout or failure to program, in accordance with an embodiment of the present invention.

FIG. 3 illustrates a method for recovering from a brownout or failure to program, in accordance with an embodiment of the present invention. The method of FIG. 3 begins with start 60 and proceeds to block 62 in which an update of a record is requested. This update request may occur as a result of a write to RAM 20 in which that write to an address location of RAM 20 needs to be reflected in flash array 26 (such as if the new data to be written to the address location is different from the existing data value). Flow then proceeds to decision diamond 64 in which it is determined whether the last created record (e.g. record2 in location 42) is indicated as a compromised record, such as, for example, due to a brownout. If it is indicated as compromised, flow proceeds to block 72 in which a recovery scheme is initiated. If not, flow proceeds to block 66 in which the next available location in flash array 26 (e.g. location 44) is programmed in response to the update request. That is, during this programming, a new record including the address location in RAM 20 corresponding to the update request and the data to be written to the address location of RAM 20 is stored in location 44. Flow then proceeds to decision diamond 68 in which it is determined whether the new record is indicated as a compromised record as a result of the programming. For example, a failure to program may have occurred during the programming of the new record and indicated as such. Therefore, during the write verification of the programming of the new record, a failure may be indicated, causing the new record to be indicated as a compromised record. If so, flow proceeds to block 72 in which the recovery scheme is initiated. However, if not, flow proceeds to block 70 in which the update of location 44 with the new record is indicated as successful. Flow then proceeds to end 84.

Referring back to block 72, block 72 initiates a recovery scheme in response to a record being indicated as compromised. If entering block 72 from decision diamond 62, the last created record is indicated as the compromised record for the purpose of the recovery scheme and if entering from decision diamond 68, the new record is indicated as the compromised record for the purpose of the recovery scheme. The recovery scheme provided in blocks 72, 76, 78, 80, and 82 will be described in reference to the example values provided in FIG. 4, which indicates the contents of locations 42, 44, and 40 in flash array 26 at various different times. Therefore, referring to time t0 in FIG. 4, note that the status of location 40 has a status value of 0b11 indicating that record3 stored in location 40 is a valid record such that data value 0x134A is stored in address location 0x000 of RAM 20. At time t0, location 42 stores record2 which has a status value of 0b11, but is indicated as a compromised record (denoted in FIG. 4 by the "?" following the data value 0x555, indicating that the last portion of the data is erroneous or unreliable), and location 44 is empty as indicated by the address being 0xFFF. Therefore, although record2 has a status of 0b11, it is indicated as a compromised record. For example, a brownout may have occurred during the update of this record prior to reset, causing the values of the record to be erroneous.

Referring back to FIG. 3, in block 72, the status bits of the compromised record are updated to 0b01 and the address portion of the compromised record is updated to 0x000 if possible, or to another stable address. For example, as seen at time t1 in FIG. 4, the bit value of status bit S1 is updated from 1 to 0, and the address portion of location 42 is updated to 0x000. If it is not possible to update the address portion to 0x000, then it is updated to any other stable address. For example, an update of the address portion to 0x000 may be attempted, but due to one or more bits which cannot be programmed (and thus would stay at a bit value of 1), the address may not be fully updated to 0x000 but to some other stable value instead.

Referring to FIG. 3, flow proceeds to block 76 in which an older record corresponding to 0x000 (or the other stable value of the address if an update to 0x000 was not achieved) in flash array 26, if such a record exists, is copied to the next available location subsequent to the compromised record. Therefore, referring back to FIG. 4, note that record3 stored in location 40 is a valid record corresponding to address 0x000. Therefore, since a valid record corresponding to 0x000 does exist, it is copied to the next available location (e.g. location 44) that is subsequent to the compromised record (in location 42). Therefore, as seen at time t2, location 44 is updated such that 0x000 is stored in the address portion and 0x134A is stored in the data portion. Therefore, location 44 now stores a new valid record that was copied from location 40.

Referring to FIG. 3, flow then proceeds to block 78 in which, if an older record existed, an update of its status bits to 0b00 is performed to indicate it is an erased record (i.e., a record that has been used but is now obsolete). Therefore, referring back to FIG. 4, at time t3, the bit values of the status bits (S1 and S0) of location 40 are each updated to a logic level 0. Referring back to FIG. 3, flow proceeds to block 80 in which the status bits of the compromised record are updated to 0b00 to indicate that it, too, is an erased record (i.e., a record that has been used but is now obsolete). Therefore, in FIG. 4, at time t4, the bit values of the status bits (S1 and S0) of location 42 are each updated to a logic level 0.

Referring back to FIG. 3, flow proceeds to block 82 in which the next available location is updated in response to the requested record update received in block 62. Therefore, in FIG. 4, at time t5, location 45 which is sequentially adjacent and subsequent to location 44 (which contains valid data copied from location 40), is updated with the new address value in RAM 20 corresponding to the requested record update received in block 62 and the new data value that is stored at that address location in RAM 20. Note that if, in block 76, an older record corresponding to 0x000 (or the other stable value of the address if an update to 0x000 was not achieved) did not exist, the next available location that would have been updated with the new address and new data corresponding to the received update request is location 44 rather than location 45. Flow then proceeds back to decision diamond 68 where flow proceeds as described above.

Therefore, after completing blocks 72-80, the compromised record of location 42 has been indicated as erased and its address has been updated to 0x000. Therefore, location 42 now represents an erased record corresponding to address location 0x000. Any existing record corresponding to 0x000 has also been copied to the next empty location subsequent to the compromised location. In this manner, flash array 26 has recovered from the existence of the compromised record. That is, the compromised record has been cleanly removed.

Figure 4:
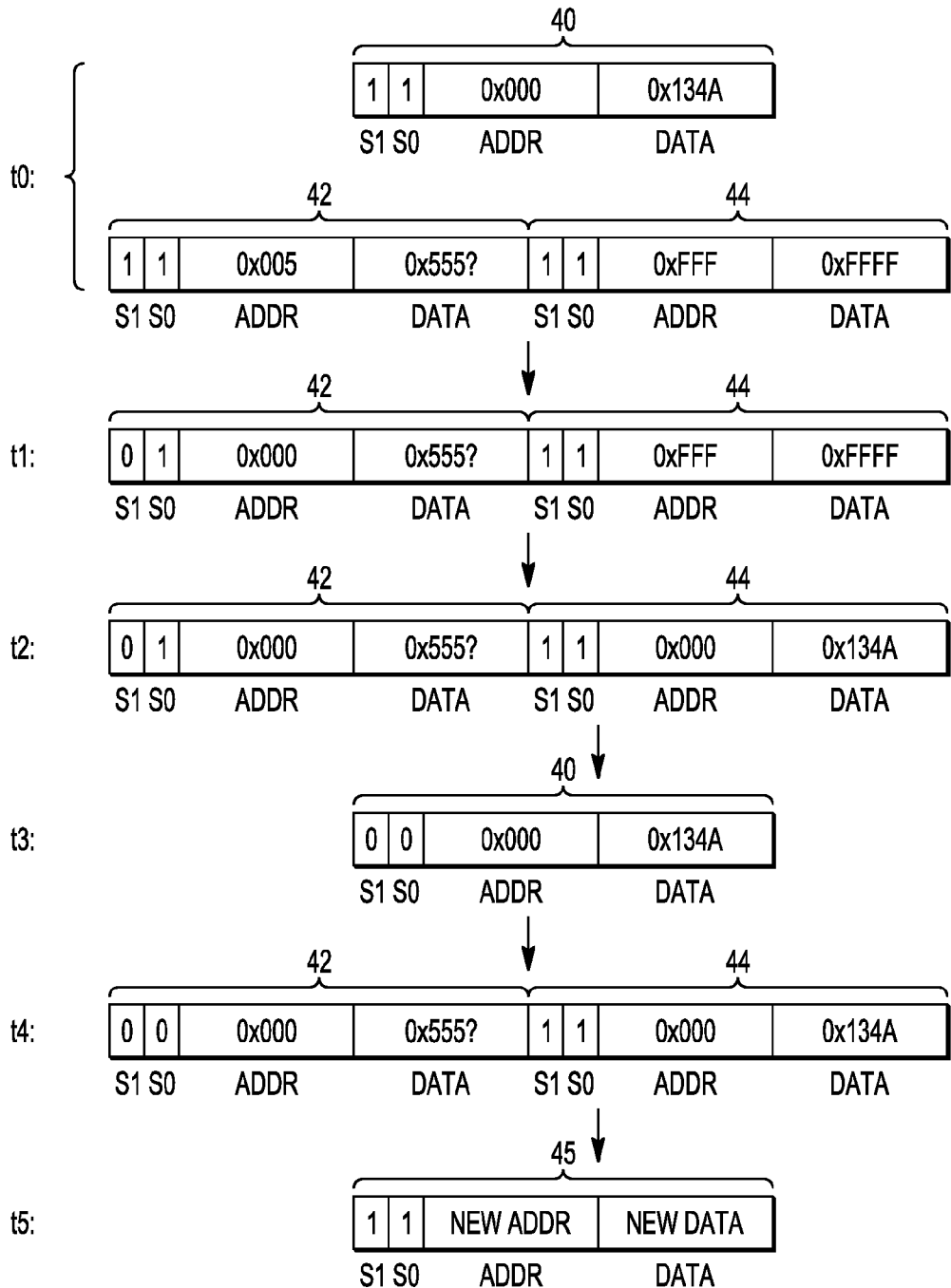
FIG. 4 illustrates, in block form, portions of the flash array of FIG. 2 at various different times, in accordance with an embodiment of the present invention.

Note that in the embodiment of FIGS. 3 and 4, the example provided included steps performed at time each of time points t0-t5. Note that in alternate embodiments, the order of some of the steps or time points may be different. Also, in the embodiment of FIG. 3, the recovery scheme is done in response to a requested record update. However, in alternate embodiments, the recovery scheme can be done at other times which are not in response to an update request. For example, it can be done as a background task. In these cases, bocks 62, 66, 68, 70, and 82 would not be present.

In one embodiment, a double brownout situation may occur. For example, referring to FIG. 2, it's possible that record1 is indicated as a compromised record due to a brownout, and during the performance of the recovery scheme of FIG. 3 to recover form the compromised record, a second brownout may have occurred. In this case, both record1 and record2 are now indicated as compromised. For example, if a brownout occurred prior to time t4, the status bits of location 42 would have remained "01" indicating that the recovery scheme had started but not yet completed. In the case of a double brownout, a recovery scheme similar to that of FIG. 3 may still be used. For example, in this case, in which there are two adjacent compromised records, such as due to a double brownout situation, the recovery scheme would begin by updating the status bits of the first compromised record (e.g. record1) to 0b01 and updating its address to 0x000 (or to another stable address), as described in reference to block 72. Then a copy of an older record corresponding to the address 0x000 (or the other stable address), if one exists, is copied to the next available location subsequent to the compromised record (as described in reference to block 76). In this example, this next available location would be location 42, because even though it is not empty, it has been compromised and can still be updated with a valid record. If the older record existed, its status is updated to 0x00 to indicate it is an erased record, as described in reference to block 78. The status bits of the compromised record, record1, is then updated to 0b00 to indicate that it has been erased, as described in reference to block 80. Therefore, it can be seen how the recovery scheme of FIG. 3, with some minor modification, can be used to recovery from multiple brownouts or from other situations which result in multiple compromised records.

In another embodiment, the recovery scheme may be used in response to a failure during a sector-level erase operation. For example, during erase of a sector in the flash memory (such as, for example, flash array 26), one or more bits may fail to reach the erased state during the allotted time. Rather than failing the operation, the erase algorithm may, for example, program the locations where status bits would normally be located, in order to designate that location in the flash array as a corrupted record. The recovery scheme could then be used as discussed herein.

In the examples described above, each record stored in array 26 stores an address/data pair corresponding to a particular address location in RAM 20. In alternate embodiments, one or more records in array 26 may store more than one address/data pair. In this case, the status bits of the record may correspond to the multiple address/data pairs of the record.

By now it should be appreciated that there has been provided a method and circuit for recovering from various different situations which result in a data error. For example, the recovery scheme described above in reference to FIG. 3 may be used to recover from a brownout, a double brownout, a failure to program, or a failure to erase. In this manner, the existence of a compromised record does not compromise the EEE memory system. Also, although the above descriptions of FIGS. 1-4 were provided with respect to a flash memory (e.g. flash array 26), any type of NVM array may be used.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory system 18 may be located on a same integrated circuit as processor 14 or on a separate integrated circuit. Memory system 18 may be an embedded memory system or a stand alone memory system. Other module(s) 16 may also be located on separate integrated circuits or devices.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, any memory system which uses sequential loading may be used rather than a EEE memory system, and any type of NVM may be used rather than a flash memory. Also, RAM 20 may or may not be present as part of memory system 18. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The following are various embodiments of the present invention.

Item 1 includes a method in a system having an emulation memory having a first sector of non-volatile memory for storing information, wherein the non-volatile memory includes a plurality of records, and wherein the method includes determining if a last record written of the plurality of records is a compromised record; if the last record written is not a compromised record, performing a next write to a record of the plurality of records that is next to the last record written; and if the last record written is a comprised record: determining an address of the compromised record; writing valid data for the address of the compromised record into the record of the plurality of records that is next to the compromised record; and writing data into a record that is next to the record of the plurality of records that is next to the compromised record. Item 2 includes the method of item 1 wherein determining the address comprises writing a valid address into the compromised record. Item 3 includes the method of item 1, wherein the step of determining if a last record written of the plurality of records is a compromised record comprises performing a verification of a write operation. Item 4 includes the method of item 1, wherein the step of determining if a last record written of the plurality of records is a compromised record comprises determining if an incomplete write had been performed on the compromised record. Item 5 includes the method of item 4, wherein the step of determining if an incomplete write had been performed on the compromised record comprises determining that power had been lost during writing of the compromised record causing an incomplete write. Item 6 includes the method of item 4, wherein the step of determining if an incomplete write had been performed on the compromised record comprises determining that power had been reduced below a predetermined magnitude during writing of the compromised record causing an incomplete write. Item 7 includes the method of item 1, wherein the step of determining if a last record written of the plurality of records is a compromised record determines that the last record written is the compromised record due to brownout. Item 8 includes the method of item 1, and further includes performing an erase of the sector; determining that a first record of the plurality of records had at least one bit that was not sufficiently erased during the step of performing an erase; and performing writes on the sector until the first record is the last record written. Item 9 includes the method of item 8, wherein the step of determining if the last record written of the plurality of records is the compromised record determines that the first record is the compromised record. Item 10 includes the method of item 1, and further includes updating status bits in the compromised record after writing data in the record next to the compromised record to indicate the compromised record is erased. Item 11 includes the method of item 1, wherein if the step of determining if the last record written of the plurality of records is a compromised record determines that the last record written is a compromised record, the method further includes updating status bits in the compromised record to indicate that the compromised record is compromised. Item 12 includes the method of item 11, and further includes further updating the status bits in the compromised record after writing data in the record next to the compromised record to indicate the compromised record is erased. Item 13 includes the method of item 12, wherein the step of determining an address of the compromised record further includes writing a valid address into the compromised record, and further includes locating a corresponding record in the emulation memory having the valid address of the compromised record; and updating status bits in the corresponding record to indicate the corresponding record is erased after writing valid data for the address of the compromised record into the record of the plurality of records next to the compromised record.

Item 14 includes a method of operating an emulation memory having a plurality of sectors including a first sector, wherein each sector has a plurality of records, the method including identifying a last record written as a compromised record; determining a valid address for the compromised record; writing valid data from a corresponding record of the plurality of records in the plurality of sectors having the valid address into a record next to the compromised record; and writing next valid data into a record next to the record next to the compromised record. Item 15 includes the method of item 14, wherein the step of determining a valid address comprises writing the valid address into the compromised record after the step of identifying the last record written as the compromised record. Item 16 includes the method of item 15, wherein the step of identifying comprises indentifying that a brownout occurred during writing of the last record written that caused last record written to be the compromised record. Item 17 includes the method of item 16, and further includes updating status bits of the compromised record to indicate that the compromised record is compromised. Item 18 includes the method of item 17 and further includes updating the status bits of the compromised record to indicate the compromised record is erased after the step of writing valid data; and updating status bits of the corresponding record to indicate the corresponding record is erased after the step of writing valid data.

Item 19 includes a method of operating an emulation memory having sectors and records within the sectors wherein erasing occurs by sector, the method including determining that a last record written was a compromised record due to one of a group consisting of failing to pass verification during writing and experiencing brownout during writing; writing an address of the compromised record to a stable address; locating a corresponding record that is valid having the stable address; writing contents of the corresponding record into a record next to the compromised record; and after the writing the contents of the corresponding record, updating status bits of the corresponding record and the compromised record to indicate that the corresponding record and the compromised record were erased. Item 20 includes the method of item 19 and further includes prior to the writing the address, updating status bits of the compromised record to indicate that the compromised record has been compromised.

What is claimed is:
1. In a system having an emulation memory having a first sector of non-volatile memory for storing information, wherein the non-volatile memory includes a plurality of records, a method comprising:
    determining if a last record written of the plurality of records is a compromised record;
    if the last record written is not a compromised record, performing a next write to a record of the plurality of records that is next to the last record written; and
    if the last record written is a compromised record:
        determining an address of the compromised record;

writing valid data for the address of the compromised record into the record of the plurality of records that is next to the compromised record; and writing data into a record that is next to the record of the plurality of records that is next to the compromised record.

2. The method of claim 1 wherein determining the address comprises writing a valid address into the compromised record.

3. The method of claim 1, wherein the step of determining if a last record written of the plurality of records is a compromised record comprises performing a verification of a write operation.

4. The method of claim 1, wherein the step of determining if a last record written of the plurality of records is a compromised record comprises determining if an incomplete write had been performed on the compromised record.

5. The method of claim 4, wherein the step of determining if an incomplete write had been performed on the compromised record comprises determining that power had been lost during writing of the compromised record causing an incomplete write.

6. The method of claim 4, wherein the step of determining if an incomplete write had been performed on the compromised record comprises determining that power had been reduced below a predetermined magnitude during writing of the compromised record causing an incomplete write.

7. The method of claim 1, wherein the step of determining if a last record written of the plurality of records is a compromised record determines that the last record written is the compromised record due to brownout.

8. The method of claim 1, further comprising:
performing an erase of the sector;
determining that a first record of the plurality of records had at least one bit that was not sufficiently erased during the step of performing an erase; and
performing writes on the sector until the first record is the last record written.

9. The method of claim 8, wherein the step of determining if the last record written of the plurality of records is the compromised record determines that the first record is the compromised record.

10. The method of claim 1, further comprising updating status bits in the compromised record after writing data in the record next to the compromised record to indicate the compromised record is erased.

11. The method of claim 1, if the step of determining if the last record written of the plurality of records is a compromised record determines that the last record written is a compromised record, further comprising updating status bits in the compromised record to indicate that the compromised record is compromised.

12. The method of claim 11, further comprising further updating the status bits in the compromised record after writing data in the record next to the compromised record to indicate the compromised record is erased.

13. The method of claim 12, wherein the step of determining an address of the compromised record further comprises writing a valid address into the compromised record, further comprising:

locating a corresponding record in the emulation memory having the valid address of the compromised record; and
updating status bits in the corresponding record to indicate the corresponding record is erased after writing valid data for the address of the compromised record into the record of the plurality of records next to the compromised record.

14. A method of operating an emulation memory having a plurality of sectors including a first sector, wherein each sector has a plurality of records, comprising:
identifying a last record written as a compromised record;
determining a valid address for the compromised record;
writing valid data from a corresponding record of the plurality of records in the plurality of sectors having the valid address into a record next to the compromised record; and
writing next valid data into a record next to the record next to the compromised record.

15. The method of claim 14, wherein the step of determining a valid address comprises writing the valid address into the compromised record after the step of identifying the last record written as the compromised record.

16. The method of claim 15, wherein the step of identifying comprises indentifying that a brownout occurred during writing of the last record written that caused last record written to be the compromised record.

17. The method of claim 16, further comprising updating status bits of the compromised record to indicate that the compromised record is compromised.

18. The method of claim 17 further comprising:
updating the status bits of the compromised record to indicate the compromised record is erased after the step of writing valid data; and
updating status bits of the corresponding record to indicate the corresponding record is erased after the step of writing valid data.

19. A method of operating an emulation memory having sectors and records within the sectors wherein erasing occurs by sector, comprising:
determining that a last record written was a compromised record due to one of a group consisting of failing to pass verification during writing and experiencing brownout during writing;
writing an address of the compromised record to a stable address;
locating a corresponding record that is valid having the stable address;
writing contents of the corresponding record into a record next to the compromised record; and
after the writing the contents of the corresponding record, updating status bits of the corresponding record and the compromised record to indicate that the corresponding record and the compromised record were erased.

20. The method of claim 19 further comprising:
prior to the writing the address, updating status bits of the compromised record to indicate that the compromised record has been compromised.

* * * * *

UNITED STATES PATENT AND TRADEMARK OFFICE
CERTIFICATE OF CORRECTION

PATENT NO.         : 8,438,327 B2                                                                                Page 1 of 1
APPLICATION NO.    : 12/826814
DATED              : May 7, 2013
INVENTOR(S)        : Ross S. Scouller et al.

It is certified that error appears in the above-identified patent and that said Letters Patent is hereby corrected as shown below:

On the Title Page, Item (57) Abstract, line 5: "record, if the" should be --record. If the--

Signed and Sealed this
Twenty-sixth Day of November, 2013

Margaret A. Focarino
*Commissioner for Patents of the United States Patent and Trademark Office*